UNITED STATES PATENT OFFICE.

CHARLES R. HARRIS AND CHRISTOPHER C. BARRICK, OF LOS ANGELES, CALIFORNIA.

COMPOSITION OF PLASTER.

No. 824,012.     Specification of Letters Patent.     Patented June 19, 1906.

Application filed June 2, 1903. Serial No. 159,809.

*To all whom it may concern:*

Be it known that we, CHARLES R. HARRIS and CHRISTOPHER C. BARRICK, residents of Los Angeles, in the county of Los Angeles and State of California, have invented certain new and useful Improvements in Compositions of Plaster; and we do hereby declare the following to be a full, clear, and exact description of the invention, such as will enable others skilled in the art to which it appertains to make and use the same.

Our invention relates to an improved composition of plaster, the object of the invention being to provide an improved plaster which will be hard, fireproof, waterproof, a non-conductor of heat, sound, or electricity, one which can be highly polished or smooth or rough surfaced, which can be given any color or tint, which will be extremely cheap to manufacture, and can be shipped in the form of a dry powder to be mixed with water for use.

The base of our improved composition is clay, and this is mixed in the proper proportions with cement, calcined plaster, and fiber. These proportions may be as follows: clay, seven hundred to one thousand pounds; calcined plaster, three hundred to nine hundred pounds; cement, one hundred and fifty to four hundered pounds, and a suitable quantity of fiber, which may be asbestos fiber, wood fiber, or other suitable fibrous material, and a suitable retarder may also be added. A preferred proportion is clay, one thousand pounds, calcined plaster, seven hundred and fifty pounds; cement, two hundred and fifty pounds; and sufficient fiber to make a binder for the mass, this varying in amount according to the character of the fiber used. If hair or jute fiber is used, from three to five pounds to the ton will answer, while if wood fiber is used from fifty to one hundred pounds to the ton can be used to good advantage, and stucco-retarder may be added to suit conditions.

Our improved composition is preferably mixed and shipped dry in the form of a powder and can be mixed with water and a suitable coloring-matter, or the coloring-matter may be added before shipment, if desired.

The primary object of a wall-covering is cheapness, strength, a non-conductor of heat, cold, electricity, and sound, and its inherent quality of being water and fire proof. In this composition we secure all these qualities and in addition produce a plaster which is hard and firm, yet not brittle or resonant, and will not warp or crack if exposed to the weather. In has great adhesive qualities to adhere to lathed, wired, or plain walls and with which either a rough or smooth highly-polished surface can be produced. It will spread easily and will provide extra long clenches to securely hold the plaster in position without danger of the clenches breaking off when dry. It can also be molded in any form and can be formed in plates or sheets and sawed into suitable lengths and secured to the wall by nails or screws, and, as before stated, it can be mixed and shipped in a dry state for use.

Various changes might be made in the relative proportions of the several ingredients set forth, and hence we do not wish to be limited to the precise proportions stated.

Having thus fully described our invention, what we claim as new, and desire to secure by Letters Patent, is—

1. A dry powder for plaster, consisting of clay in the proportion of from seven hundred to one thousand pounds, calcined plaster in the proportion of from three hundred to nine hundred pounds, cement in the proportion of from one hundred and fifty to four hundred pounds and fiber in the proportion substantially as specified.

2. A dry powder for plaster, consisting of clay in the proportion of from seven hundred to one thousand pounds, calcined plaster in the proportion of from three hundred to nine hundred pounds, cement in the proportion of from one hundred and fifty to four hundred pounds, fiber in the proportion substantially as specified and a retarder.

3. A dry powder for plaster, consisting of clay in the proportion of from seven hundred to one thousand pounds, calcined plaster in the proportion of from three hundred to nine hundred pounds, and cement in the proportion of from one hundred and fifty to four hundred pounds.

In testimony whereof we have signed this specification in the presence of two subscribing witnesses.

CHAS. R. HARRIS.
CHRISTOPHER C. BARRICK.

Witnesses:
M. L. CUSHING,
CARL PAULY.